(12) United States Patent
Takemura et al.

(10) Patent No.: US 6,748,812 B1
(45) Date of Patent: Jun. 15, 2004

(54) FLOW RATE MEASURING APPARATUS

(75) Inventors: Koichi Takemura, Yamatokoriyama (JP); Yukio Nagaoka, Soraku-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/019,989

(22) PCT Filed: May 11, 2000

(86) PCT No.: PCT/JP00/03044

§ 371 (c)(1),
(2), (4) Date: Nov. 9, 2001

(87) PCT Pub. No.: WO00/68649

PCT Pub. Date: Nov. 16, 2000

(30) Foreign Application Priority Data

May 11, 1999 (JP) .......................................... 11-129599

(51) Int. Cl.$^7$ ................................................ G01F 1/66
(52) U.S. Cl. ...................................... 73/861.29; 702/54
(58) Field of Search ......................... 73/861.29, 861.18, 73/861.19, 861.23, 861.27, 861.28; 702/1, 33, 39, 45, 48, 50, 54

(56) References Cited

U.S. PATENT DOCUMENTS

| 4,976,154 A | * | 12/1990 | Schneider et al. ....... 73/861.06 |
| 5,144,838 A | * | 9/1992 | Tsuboi .......................... 702/39 |
| 5,753,824 A | * | 5/1998 | Fletcher-Haynes ....... 73/861.28 |
| 5,777,892 A | * | 7/1998 | Nabity et al. ............. 73/861.28 |
| 6,510,397 B1 | * | 1/2003 | Choe .......................... 702/33 |
| 6,587,796 B2 | * | 7/2003 | Fukuhara ................. 73/861.29 |

FOREIGN PATENT DOCUMENTS

| EP | 0 806 635 A1 | 11/1997 |
| JP | 9-21667 | 1/1997 |
| JP | 9-257539 | 10/1997 |

* cited by examiner

Primary Examiner—Harshad Patel
(74) Attorney, Agent, or Firm—Snell & Wilmer, LLP

(57) ABSTRACT

A flow rate measuring apparatus includes: flow rate detection section 2 and 3 provided in a fluid flow path 1; a measuring section 10 for measuring an output from the flow rate detection sections 2 and 3; a cycle setting section 9 for setting a measurement cycle of the flow rate detection sections 2 and 3; a resolution setting section 7 for setting a measurement resolution of the measuring section 10; a flow rate calculation section 11 for calculating a flow rate based on an output from the measuring section 10; and a measurement control section 12 for controlling each of the sections.

14 Claims, 9 Drawing Sheets

1 Fluid flow path
2 First transducer
3 Second transducer
12 Measurement control section

FLOW RATE MEASURING APPARATUS

TECHNICAL FIELD

The present invention relates to a flow rate measuring apparatus for measuring a flow rate of a gas, etc., by intermittently driving ultrasonic transducers and/or a thermal flow sensor.

BACKGROUND ART

Conventionally, flow rate measuring apparatuses of the type using an ultrasonic wave are known in the art, such as that disclosed in Japanese Laid-Open Publication No. 9-21667. As illustrated in FIG. 12, in a conventional flow rate measuring apparatus, ultrasonic transducers 2 and 3 are provided as part of a fluid pipe 1 so as to oppose each other, and the ultrasonic transducer 3 is provided so as to be ahead of the ultrasonic transducer 2 in a flow direction. The flow rate measuring apparatus causes the transducer 2 to generate an ultrasonic wave along the flow direction. When the transducer 3 detects the ultrasonic wave, the flow rate measuring apparatus causes the transducer 2 to generate the ultrasonic wave again and repeats this operation to measure the duration. The flow rate measuring apparatus also causes the transducer 3 to generate an ultrasonic wave against the flow direction and similarly repeats the operation to measure the duration. The flow rate measuring apparatus calculates a fluid velocity based on a difference in the duration. In the case where such a conventional flow rate measuring apparatus is driven by batteries, if a great deal of electric power is consumed by transmitting/receiving the ultrasonic wave, the batteries run out in a short period of time. Therefore, in order to reduce power consumption, measuring operations are required to be intermittently performed based on a constant cycle or a variable cycle in accordance with a measured flow rate. In particular, when a flow rate is zero, a measurement cycle is long. In such a case, a large flow rate can unexpectedly occur, and thus a search measurement (the number of times the search measurement is repeated is less than the number of times the regular measurement is repeated) is performed in the intervals of a regular measurement so as to detect the unexpected large flow rate.

However, not only in the case where there is a zero flow rate but also in the case where there is some flow rate amount, if the measurement cycle is too long, when abrupt flow rate variations occur during an idling period of the measurement, the flow rate measuring apparatus occasionally cannot sense the abrupt variations, so that a difference in measurement is caused.

The present invention solves the above-described problem. An objective of the present invention is to reduce power consumption and realize high-precision measurement.

DISCLOSURE OF THE INVENTION

A flow rate measuring apparatus of the present invention includes: a flow rate detection section provided in a fluid flow path; a measuring section for measuring an output from the flow rate detection section; a cycle setting section for setting a measurement cycle of the flow rate detection section; a resolution setting section for setting a measurement resolution of the measuring section; a flow rate calculation section for calculating a flow rate based on an output from the measuring section; and a measurement control section for controlling each of the sections, in which the measurement control section includes: a regular measuring section for setting a predetermined value in the cycle setting section and the resolution setting section so as to obtain a measured flow rate based on a value obtained by the setting; and a search measuring section for setting in the cycle setting section a cycle which is shorter than that set by the regular measuring section during an idling period of the regular measuring section and for setting a coarse resolution in the resolution setting section so as to estimate a flow rate during an idling period of the regular measuring section based on a value obtained by the setting.

With the above-described structure, flow rate variations can be detected by performing the search measurement, and thus the frequency of the use of the regular measurement can be reduced. The electric power consumed by the search measurement is small and there is no need to use an additional flow rate detection section having another structure, so that the power consumption can be reduced and high-precision measurement can be realized.

The flow rate detection section may include a first transducer for transmitting an ultrasonic wave signal and a second transducer for receiving the ultrasonic wave signal, the measuring section may repeat an ultrasonic wave propagation between the first transducer and the second transducer so as to measure an accumulated time of the ultrasonic wave propagation, the cycle setting section may set a measurement start cycle for the first transducer and the second transducer, and the resolution setting section may set the number of times to repeat the ultrasonic wave propagation.

With the above-described structure, in the search measurement, the number of times to repeat the ultrasonic wave propagation can be reduced. In this case, the duration of the search measurement is shorter than that of the regular measurement and the search measurement is performed in an extremely instantaneous manner. Therefore, for example, fluctuations in a pulsed flow rate caused by fluctuations in a fluid pressure can be detected and it is possible to increase the measurement sensitivity to flow rate variations.

The flow rate, detection section may include a thermal flow sensor, the measuring section may measure heat output from the flow sensor, the cycle setting section may set a measurement cycle of the flow sensor, and the resolution setting section may set the quantity of heat input to the flow sensor so as to set a measurement resolution of the measuring section.

With the above-described structure, in the search measurement, the quantity of heat input to a heater can be reduced. The search measurement is performed such that the quantity of consumed heat is reduced in comparison to the case where the regular measurement is performed, and thus it is possible to increase the durability of hot wires of the thermal flow sensor and the reliability of a thermal flow rate measuring apparatus including such a thermal flow sensor.

The regular measuring section may set the measurement cycle in the cycle setting section so as to last for a long period of time as the measured flow rate is decreased. In this case, by performing the search measurement, flow rate variations during the idling period of the regular measurement can be sensed, and in particular, when the flow rate is small, the measurement cycle can be set so as to last for a long period of time, so that the frequency of operation can be reduced, and thus the power consumption can be reduced.

The regular measuring section may set a measurement cycle in the cycle setting section so as to last for a long period of time as an estimated flow rate is decreased. In this case, by performing the search measurement, the flow rate variations can be predicted and the regular measurement cycle can be changed, and thus, in particular, when the flow rate is small, the power consumption can be reduced and it is possible to increase the measurement sensitivity to flow rate variations.

The regular measuring section may set a measurement resolution in the resolution setting section to be coarse as an estimated flow rate is increased. Flow rate variations can be predicted by performing the search measurement. In particular, when the flow rate is large, the measurement resolution is set to be coarse, so that and an operating current is reduced. Thus, the power consumption can be reduced.

When a difference between the measured flow rate and the estimated flow rate is less than a predetermined value, the regular measuring section may set the measurement cycle in the cycle setting section so as to last for a long period of time. In this case, by performing the search measurement, when the flow rate variations are small, the measurement cycle can be set so as to last for a long period of time, so that the frequency of operation can be reduced, and thus the power consumption can be reduced.

Moreover, when a difference between the measured flow rate and the estimated flow rate is less than a predetermined value, the regular measuring section may set the measurement resolution in the resolution setting section to be coarse. In this case, by performing the search measurement, when the flow rate variations are small, the measurement resolution can be set to be coarse, thus reducing an operating current. Thus, the power consumption can be reduced.

When a difference between the measured flow rate and the estimated flow rate is equal to or more than a predetermined value, the regular measuring section may set the measurement resolution in the resolution setting section to be fine. In this case, by performing the search measurement, when the flow rate variations are large, the measurement resolution can be set to be fine, and thus the measurement sensitivity to flow rate variations is increased.

Moreover, when a difference between the measured flow rate and the estimated flow rate is equal to or more than a predetermined value, the regular measuring section may set the measurement cycle in the cycle setting section to be short. In this case, by performing the search measurement, when the flow rate variations are large, the measurement cycle can be set to be short, and thus the measurement sensitivity to flow rate variations is increased.

The flow rate measuring apparatus of the present invention may further include an integrating section for performing an integrating process using only the measured flow rate. In the case where flow rate variations obtained by the search measurement are large, the regular measurement is performed and values obtained by the regular measurement are integrated. Thus, a high-precision integrated flow rate can be obtained.

The flow rate measuring apparatus of the present invention may further include an integrating section for performing an integrating process using the measured flow rate and an estimated flow rate, in which a difference between the measured flow rate and the estimated flow rate is equal to or more than a predetermined value. In the case where flow rate variations are large, the regular measurement and integration are performed, and an estimated flow rate at a starting point of variations is reflected in an integrated value, and thus a high-precision integrated flow rate can be obtained with high measurement sensitivity to flow rate variations.

BEST MODE FOR CARRYING OUT THE INVENTION

Hereinafter, examples of the present invention will be described with reference to the drawings.

EXAMPLE 1

Figure 1:
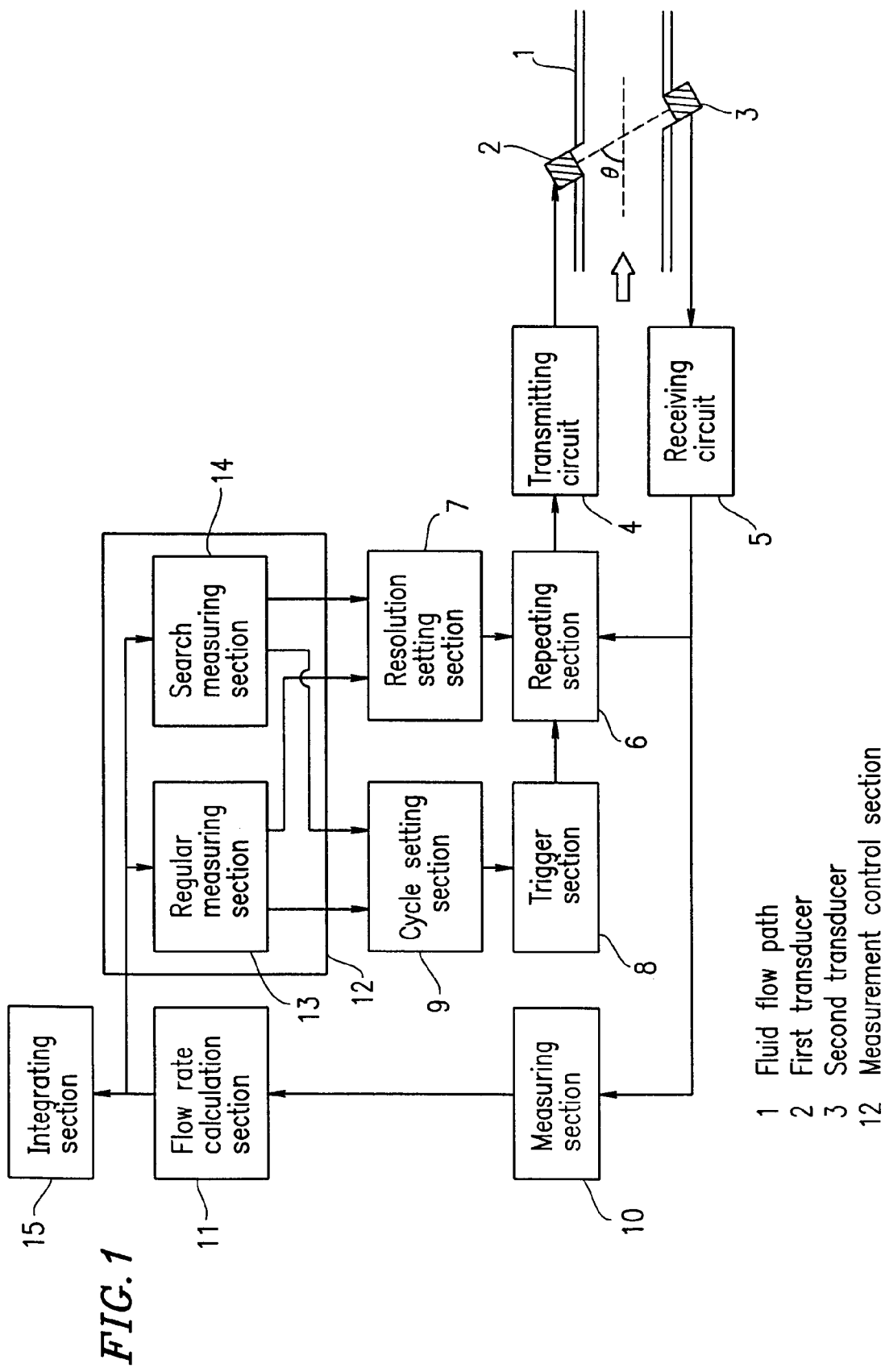
FIG. 1 is a block diagram of a flow rate measuring apparatus according to Example 1 of the present invention.

FIG. 1 is a block diagram of a flow rate measuring apparatus according to Example 1 of the present invention. In FIG. 1, a first transducer 2 for transmitting an ultrasonic wave and a second transducer 3 for receiving the ultrasonic wave are disposed along a flow direction in the course of a fluid flow path 1. In FIG. 1, reference numeral 4 denotes a transmitting circuit for the first transducer 2; reference numeral 5 denotes a receiving circuit for performing signal processing of the ultrasonic wave received by the second transducer 3; reference numeral 6 denotes a repeating section for causing multiple repetitions of transmission by the first transducer 2 and reception by the second transducer 3 after the receiving circuit 5 detects the ultrasonic wave; reference numeral 7 denotes a resolution setting section for setting the number of repetitions of transmission and reception caused by the repeating section 6, i.e., a measurement resolution; reference numeral 8 denotes a trigger section for giving instructions for a start of an intermittent measurement; reference numeral 9 denotes a cycle setting section for setting an output cycle of the trigger section 8; reference numeral 10 denotes a measuring section for measuring the duration of ultrasonic propagation caused to be performed multiple times by the repeating section; and reference numeral 11 denotes a flow rate calculation section for determining a flow rate from a measured value obtained by the measuring section 10. Reference numeral 12 denotes a measurement control section for controlling each of the elements denoted by reference numerals 2–11 and includes a regular measuring section 13 and a search measuring section 14. The regular measuring section 13 and the search measuring section 14 control measurement operations by setting numerical values in the resolution setting section 7 and the cycle setting section 9 in accordance with regular measuring and search measuring methods, described below. Reference numeral 15 denotes an integrating section for obtaining an integrated flow rate by integrating flow rate values determined by the flow rate calculation section 11.

An operation and an effect of the flow rate measuring apparatus according to Example 1 of the present invention will now be described. For each lapse of a time set from the cycle setting section 9, the trigger section 8 outputs a measurement start trigger via the repeating section 6 to the transmitting circuit 4. An ultrasonic wave signal transmitted by the first transducer 2, responsive to a burst signal sent from the transmitting circuit 4, propagates through a fluid flow. The ultrasonic wave signal is received by the second transducer 3, and is thus detected by the receiving circuit 5. Thereafter, the transmitting circuit 4 transmits a burst signal again. The burst signal is transmitted via the transmitting circuit 5 to the repeating circuit 6. The repeating circuit 6 repeats this cycle the number of times predetermined by the resolution setting section 7. The measuring section 10 measures the duration of the cycle repetition. When a sonic velocity in a quiescent fluid is c and a flow velocity of the fluid is v, a propagation velocity of an ultrasonic wave flowing in a forward direction is represented by $(c+v)$. A relationship of a distance L between the transducers 3 and 4, an angle θ formed by a ultrasonic wave propagation axis with respect to a central axis of the fluid pipe (fluid flow path 1), and a time t required for the ultrasonic wave to propagate from the first transducer to the second transducer is represented by:

$$t = L/(c + v \cos \theta) \qquad (1).$$

Here, t is a relatively small value, and it is difficult to obtain a sufficient resolution to measure the propagation of the ultrasonic wave as a single phenomenon. Accordingly, a method which repeats transmission and reception multiple times so as to obtain an average value is used. In the case where transmission and reception are suitably repeated a number of times n in accordance with a measurement resolution of the measuring section 10, a measured value T is readable and can be represented by expression (2):

$$T = n \times L/(c + v \cos \theta) \qquad (2).$$

Expression (2) is transformed into:

$$v = (n \times L/T - c)/\cos \theta \qquad (3),$$

such that if L and θ are known values, the flow velocity v is determined by measuring T. From this flow velocity, when a transverse-sectional area is S and a correction coefficient is K, a flow rate Q is represented by:

$$Q = KSv \qquad (4).$$

As can be seen from expressions (3) and (4), a resolution of the flow rate Q can be improved by increasing the number of times n of repetition. The flow rate calculation section 11 performs calculation processes represented by expressions (3) and (4) using the measured value T obtained by the measuring section 10 so that a flow rate at the time of sampling is determined. For each lapse of time $t_a$ (sec.) set by and stored in the cycle setting section 9, the above-described sequential operation, which starts with the trigger output by the trigger section 8 and is ended by the calculation process by the flow rate calculation section 11, is repeated $n_a$ times set by and stored in the resolution setting section 7 in accordance with instructions of the regular measuring section 13. The flow rate obtained by this operation is called a measured flow rate. Before the cycle $t_a$ set by the cycle setting section 9 lapses, a rough flow rate is obtained by the search measuring section 14. The obtained flow rate is called an estimated flow rate. A procedure of obtaining the estimated flow rate is basically the same as that performed by the regular measuring section 13 except that transmission and reception are repeated a differing number of times and a different measuring cycle is used. A search measurement is performed for the purpose of estimating a flow rate during an idling period of a regular measuring section, and thus it is necessary to perform the search measurement in a cycle which is shorter than that for the regular measurement and to reduce power consumption while precision can be slightly lowered. Along with an increase in the number of times of repetitions, the power consumption is increased. Therefore, the search measurement may be repeated a number of times which is less than the number of repetitions for the regular measurement. The cycle setting section 9 sets the cycle $t_b$ for the search measurement and stores this cycle therein. Starting with a trigger output at the time of the regular measurement, the trigger section 8 outputs a trigger upon each lapse of the cycle $t_b$ ($<t_a$). The resolution setting section 7 sets the number of times $n_b$ ($<n_a$) to repeat transmission/reception for the search measurement and stores this number therein. After transmission and reception are repeated the number of times $n_b$ of repetitions, the flow rate calculation section 11 obtains an estimated flow rate based on a measurement result obtained by the measuring section 10.

As described above, flow rate variations can be detected by performing the search measurement, and thus the frequency of the use of the regular measurement can be reduced. The electric power consumed by the search measurement is small and there is no need to use an additional flow rate detection section having another structure, so that the power consumption can be reduced and high-precision measurement can be realized.

The search measurement is performed such that the number of repetitions is reduced in comparison to the case where the regular measurement is performed, and thus the duration of the search measurement is shorter than that of the regular measurement, the search measurement being performed in an extremely instantaneous manner. Therefore, for example, fluctuations in a pulsed flow rate caused by fluctuations in a fluid pressure can be detected and it is possible to increase measurement sensitivity to flow rate variations.

EXAMPLE 2

Figure 2:
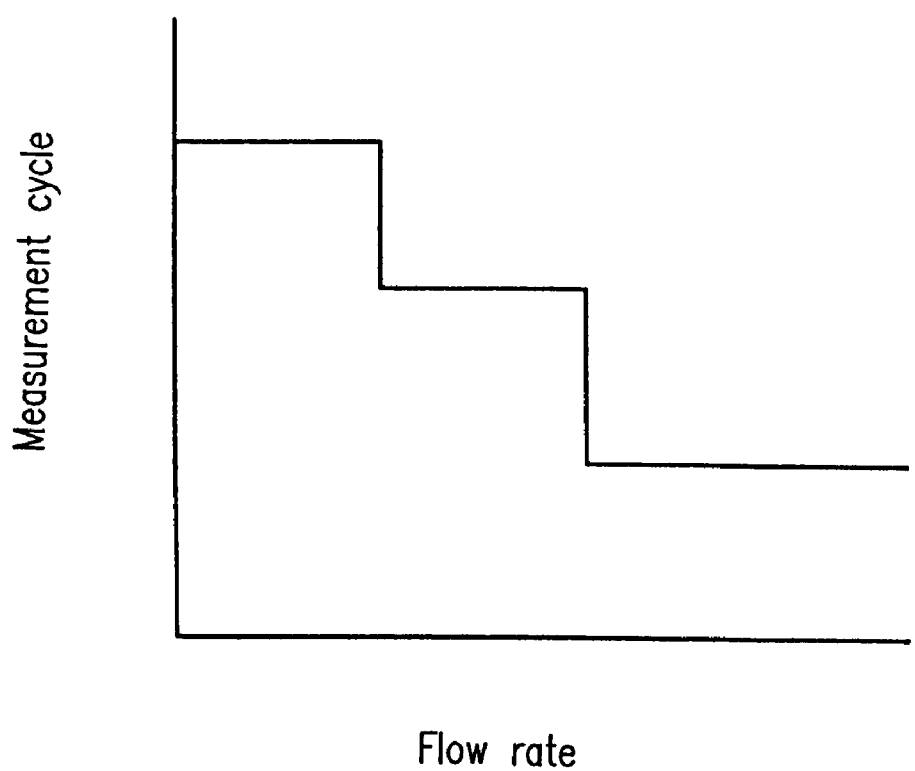
FIG. 2 is a graph illustrating a performance characteristic of a flow rate measuring apparatus according to Example 2 of the present invention.
Figure 3:
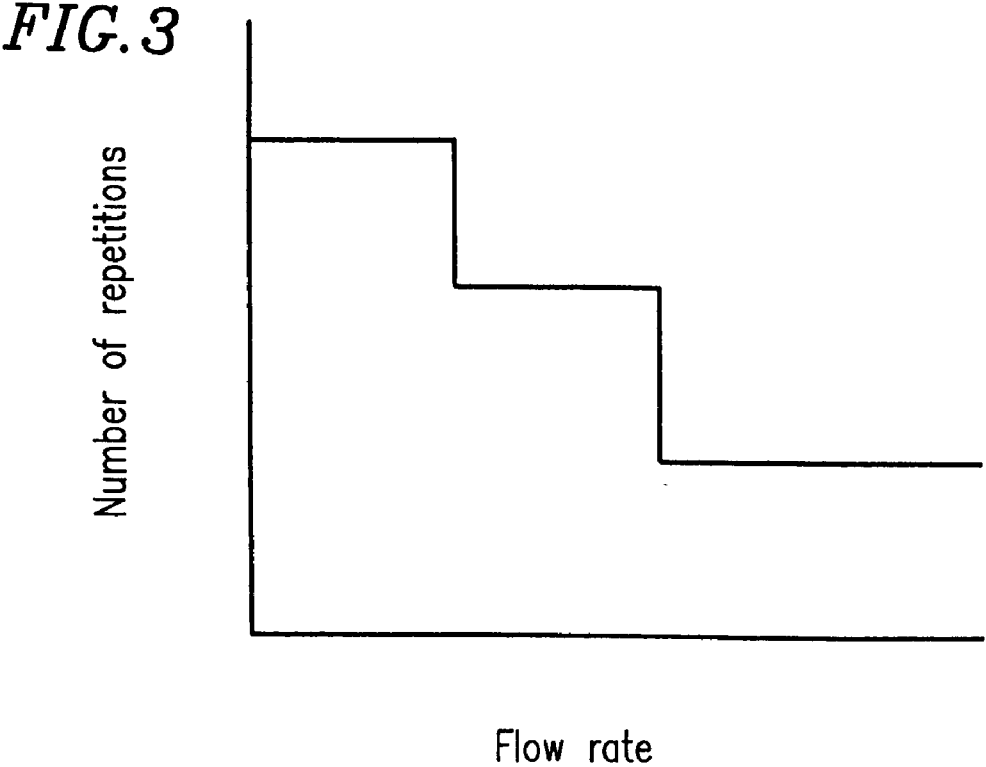
FIG. 3 is a graph illustrating another performance characteristic of the flow rate measuring apparatus according to Example 2 of the present invention.

FIG. 2 is a graph illustrating a performance characteristic of an operation of a flow rate measuring apparatus according to Example 2 of the present invention. FIG. 3 is a graph illustrating another performance characteristic of the same flow rate measuring apparatus. An operation of the flow rate measuring apparatus according to Example 2 of the present invention is mainly identical to that of the flow rate measuring apparatus illustrated in FIG. 1, and thus the description thereof will be omitted. The operation of the flow rate measuring apparatus of Example 2 differs from that of the flow rate measuring apparatus of Example 1 in that the measurement control section 12 of Example 2 changes an operation cycle and a resolution of the regular measuring section 13 in accordance with a flow rate measured by the regular measuring section 13.

Referring to FIGS. 1, 2 and 3, the operation and an effect of the flow rate measuring apparatus of Example 2 will now be described. The regular measuring section 13 changes a regular measurement cycle in accordance with a present flow rate, i.e., a measured flow rate obtained by the regular measuring section 13 during the latest measurement, or an average flow rate for the last several measurements, i.e., an average value of measured flow rates obtained by the regular measuring section 13. As illustrated in FIG. 2, a measurement cycle of the regular measuring section 13 lasts for a long period of time as a flow rate obtained by the regular measuring section 13 is decreased. That is, in an area where an absolute value of a flow rate is small, even if a slight difference in a flow rate occurs, such a difference does not affect an entire integrated flow rate. In such a case, even when the flow rate is particularly small and the regular measurement cycle is extended, flow rate variations during an idling period of the regular measurement can be securely sensed by the search measuring section 14. Accordingly, in comparison to the case where the search measurement is not performed, the regular measurement cycle can be set so as to last for a long period of time.

As described above, by performing the search measurement, flow rate variations during the idling period of the regular measurement can be sensed, and in particular, when the flow rate is small, the measurement cycle can be set so as to last for a long period of time, so that the frequency of operation can be reduced, thus reducing the power consumption.

The measurement cycle of the regular measuring section 13 may be changed in accordance with an estimated flow rate obtained by the search measuring section 14. In this case, the measurement cycle required for the subsequent flow rate measurement is predictively predetermined based on the estimated flow rate. Accordingly, even in the case where the flow rate is particularly small and the regular measurement cycle is long, when the flow rate is large during the idling period of the regular measuring section 14, the regular measurement cycle can be instantly shortened, and thus the flow rate variations can be more securely sensed.

As described above, by performing the search measurement, the flow rate variations during the idling period of the regular measurement can be predicted and the regular measurement cycle can be changed, and thus, in particular, when the flow rate is small, the power consumption can be reduced and it is possible to increase the measurement sensitivity to flow rate variations.

In Example 2, the measurement cycle is gradually changed, but the change of the measurement cycle may be a continuous function, such as a linear function or an inverse variation.

The number of repetitions can be set by a determination section 16 (FIG. 4) so as to be smaller as illustrated in FIG. 3, i.e., a measurement resolution for the regular measurement is set to be coarse, as the estimated flow rate obtained by the search measuring section 14 is increased. In a gas meter for household use, a high precision of ±1 to 3% is required for a flow rate range in which a maximum value is approximately ten thousand times as large as a minimum value. The required resolution differs in accordance with the flow rate and a finer resolution is required as the flow rate decreases. Therefore, the required resolution is predicted based on the estimated flow rate measured by the search measuring section 14 and the measurement resolution for the regular measurement is set so as to be coarser as the flow rate increases.

As described above, by performing the search measurement, the flow rate variations can be predicted, and in particular, when the flow rate is large, the measurement resolution is set so as to be coarse and an operating current is reduced, and thus the power consumption can be reduced.

In Example 2, the measurement resolution is gradually changed, but the change of the measurement resolution may be a continuous function, such as a linear function or an inverse variation.

EXAMPLE 3

Figure 4:
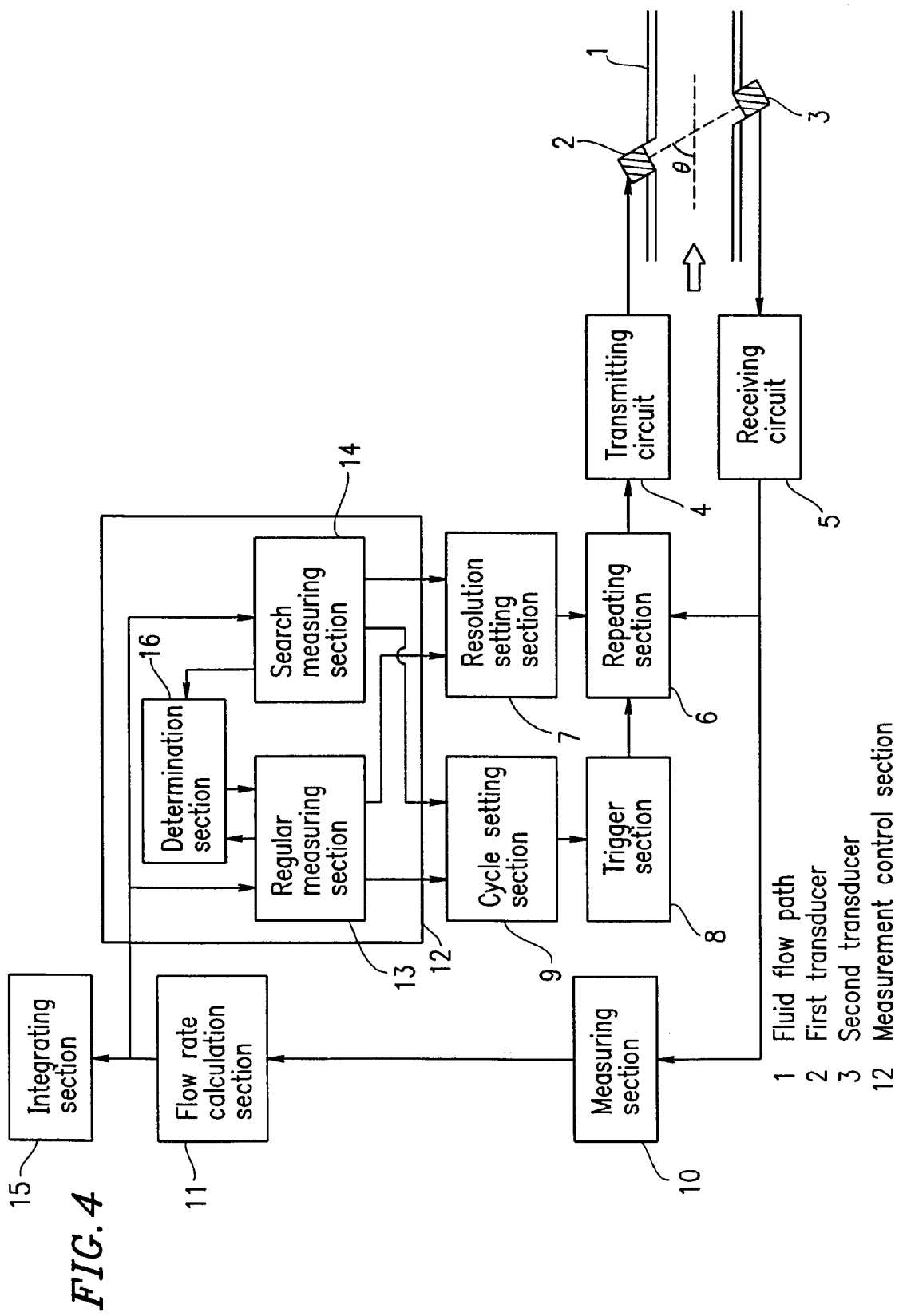
FIG. 4 is a block diagram of a flow rate measuring apparatus according to Example 3 of the present invention.
Figure 5:
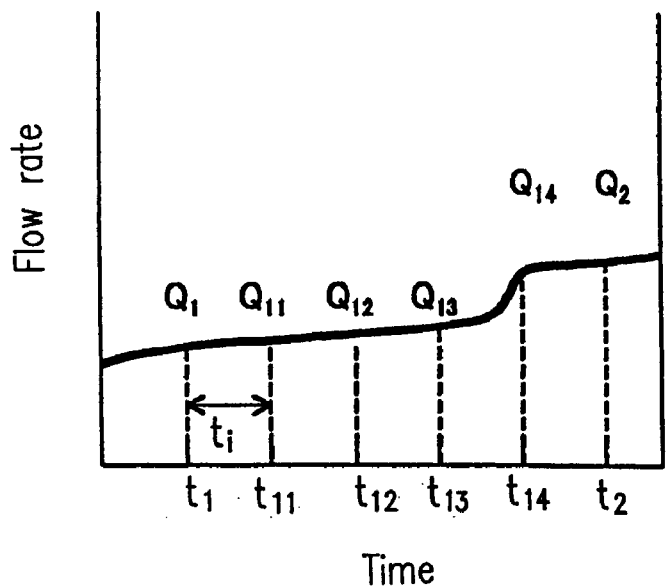
FIG. 5 is a timing chart illustrating an operation of the flow rate measuring apparatus according to Example 3 of the present invention.

FIG. 4 is a block diagram of a flow rate measuring apparatus according to Example 3 of the present invention. FIG. 5 is a timing chart illustrating an operation of the flow rate measuring apparatus of Example 3.

In FIG. 4, components similar to those illustrated in FIG. 1 are denoted by the same reference numerals, and thus detailed description thereof will be omitted and components which are different from those illustrated in FIG. 1 will be focused on in the following description. FIG. 4 differs from FIG. 1 in that the measurement control section 12 of FIG. 4 includes the determination section 16, which determines the measurement cycle of the regular measuring section 13 based on a difference between an estimated flow rate obtained by the search measuring section 14 and a measured flow rate obtained by the regular measuring section 13.

Referring to FIGS. 4 and 5, an operation and an effect of the flow rate measuring apparatus of Example 3 will now be described. The regular measuring section 13 can set the measurement cycle by $t_i$ seconds and change, according to circumstances, the cycle using $2t_i$ seconds as an initial value. The search measuring section 14 fixes the search measurement cycle during an idling period of the regular measuring section 13 to $t_i$ seconds. Next, a method for determining the measurement cycle of the regular measuring section 13 is described. In FIG. 5, times $t_1$ and $t_2$ represent the measurement timing of the regular measuring section 13. Flow rate values measured at times $t_1$ and $t_2$ are $Q_1$ and $Q_2$, respectively. Times $t_{11}$, $t_{12}$, $t_{13}$, and $t_{14}$ represent the measurement timing of the search measuring section. The cycle lasts for $t_i$ seconds and estimated flow rate measured values at times $t_{11}$, $t_{12}$, $t_{13}$, and $t_{14}$ are $Q_{11}$, $Q_{12}$, $Q_{13}$ and $Q_{14}$, respectively.

Firstly, at time $t_1$, the determination section 16 stores the flow rate $Q_1$ obtained by the regular measurement. Although the timing of the subsequent regular measurement is $t_{12}$ which is $2t_i$ seconds from time $t_1$, before the subsequent regular measurement, the search measurement is performed at time $t_{11}$ which is $t_i$ seconds from time $t_1$, so that $Q_{11}$ is obtained as an estimated flow rate. At this time, the determination section 16 obtains an amount of a flow rate variation $\Delta$ (an absolute value) from the latest flow rate $Q_1$ and estimated flow rate $Q_{11}$ using the following expression:

$$\Delta = |Q_{11} - Q_1|/Q_1 \qquad (5).$$

Since the absolute value of the variation amount is smaller than a predetermined amount of the variations m and it is not considered that there are significant flow rate variations, a regular measurement initially scheduled at time $t_{12}$ is cancelled and is rescheduled at time $t_{13}$. The search measurement is performed again $t_i$ seconds later, at time $t_{12}$. The determination of a flow rate is performed based on a variation amount between a searched flow rate $Q_{12}$ obtained by this search measurement and the searched flow rate $Q_1$ in a similar manner as performed at $t_{11}$. In this case, flow rate variations are also small, and thus a regular measurement scheduled at time $t_{13}$ is delayed until time $t_{14}$. Hereafter, similar determination operations will be repeated and if flow rate variations are small, the measurement cycle will be successively delayed. If a variation amount of the searched flow rate $Q_{14}$ with respect to the measurement flow rate $Q_1$ is determined to be large at time $t_{14}$, the regular measurement is performed $t_i$ seconds later at time $t_2$.

As described above, when it is determined that flow rate variations are small by performing the search measurement, the measurement cycle is set so as to last for a long period of time, so that the frequency of operation can be reduced, and thus the power consumption can be reduced.

In Example 3, although the determination for shortening the regular measurement cycle is obtained based on a rate of flow rate variations, the determination may be obtained based on an absolute magnitude. The determined value may be different among different flow rates.

EXAMPLE 4

Figure 6:
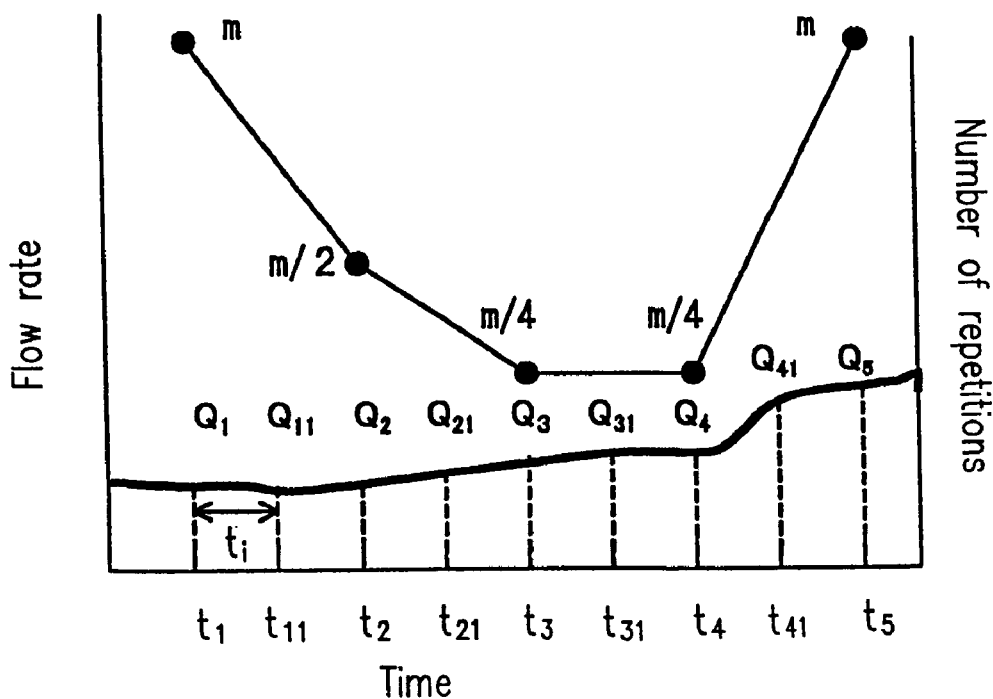
FIG. 6 is a timing chart illustrating an operation of a flow rate measuring apparatus according to Example 4 of the present invention.

FIG. 6 is a timing chart illustrating an operation of a flow rate measuring apparatus according to Example 4 of the present invention.

Referring to FIGS. 4 and 6, an operation and an effect of the flow rate measuring apparatus of Example 4 will now be described. In FIG. 4, components described in Example 3 will be denoted by the same reference numerals, and thus detailed description thereof will be omitted and functions which are different from those described in Example 3 will be focused on in the following description. The determination section 16 changes a measurement resolution of the regular measuring section 13 based on a difference between an estimated flow rate obtained by the search measuring section 14 and a measured flow rate obtained by the regular measuring section. The regular measuring section 13 can set the number of times to repeat a measurement, i.e., a measured resolution, by a single repetition and can change, according to circumstances, the number of times to repeat a measurement, where an initial value of the number of times is set to m. The measurement cycle is fixed at $2t_i$ seconds. The search measuring section 14 sets the number of times to repeat the search measurement during an idling period of the regular measuring section 13 at m/20 and sets the cycle of the search measurement at $t_i$ seconds.

Referring to FIG. 6, a method for determining the measurement cycle of the regular measuring section will now be described. Firstly, at time $t_1$, the flow rate $Q_1$ is obtained by the regular measurement. Although the timing of the subsequent regular measurement is $t_2$, which is $2t_i$ seconds from time $t_1$, before the subsequent regular measurement, the search measurement is performed at time $t_{11}$ which is $t_i$ seconds from time $t_1$, so that $Q_{11}$ is obtained as an estimated flow rate. At this time, the determination section 16 determines flow rate variations from $Q_1$ and $Q_{11}$ using expression (5). When the absolute value of the flow rate variations is smaller than a predetermined value, it is not considered that there are significant flow rate variations, and the number of times to repeat the regular measurement at time $t_2$ is reset at m/2, and thus the resolution of the regular measurement is reset so as to be degraded by half. The regular measurement is performed at time $t_2$, which is $t_i$ seconds from $t_{11}$, with the number of repetitions m/2, so that the flow rate value $Q_2$ is obtained. The search measurement is performed $t_i$ seconds later, at time $t_{21}$. The determination of a flow rate is performed based on a variation amount between a searched flow rate $Q_{21}$ obtained by this search measurement and the searched flow rate $Q_2$ in a similar manner as performed at $t_{11}$. In this case, flow rate variations are also small, and thus the number of times to repeat a subsequent regular measurement scheduled at time $t_3$ is set at m/4. Hereafter, similar determination operations will be repeated and if flow rate variations are small, the number of times to repeat the regular measurement will be decreased. However, a required resolution is determined in accordance with a particular range of a flow rate. In the case where a required lowest resolution is m/4 in the proximity of the present flow rate, even if an amount of flow rate variations is small at time $t_4$ or later, the number of repetitions is not decreased. Since variations in an estimated flow rate $Q_{41}$ at time $t_{41}$ are large with respect to the flow rate $Q_4$ at time $t_4$, the number of times to repeat a measurement is reset to the initial value m at the following time $t_5$. When flow rate variations occur, the measurement resolution is further set so as to be finer, and thus increasing the measurement sensitivity to flow rate variations.

As described above, in the case where flow rate variations obtained by the search measurement are small, by setting the measurement resolution to be coarse, an operating current is reduced, and thus the power consumption can be reduced.

Moreover, in the case where flow rate variations obtained by the search measurement are large, the measurement resolution is set to be fine, and thus the measurement sensitivity to flow rate variations is increased.

In Example 4, although the determination of flow rate variations is obtained based on a rate of flow rate variations, the determination may be obtained based on an absolute magnitude. The determined value may be different among different flow rates.

EXAMPLE 5

Figure 7:
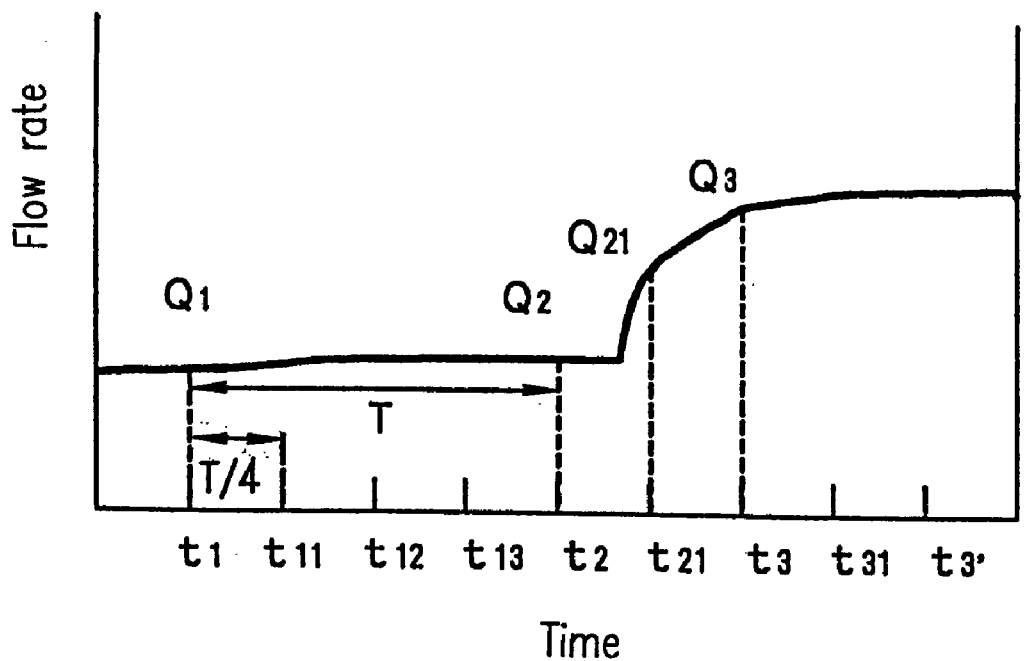
FIG. 7 is a timing chart illustrating an operation of a flow rate measuring apparatus according to Example 5 of the present invention.

FIG. 7 is a timing chart illustrating an operation of a flow rate measuring apparatus according to Example 5 of the present invention. FIGS. 8A–8D are graphs each illustrating a characteristic of an operation of the integrating section.

Referring to FIGS. 4, 7, and 8A–8D, an operation and an effect of the flow rate measuring apparatus of Example 5 will be described. In FIG. 4, similar functions of the flow rate measuring apparatus of Example 5 to those described in Example 3 and 4 are denoted by the same reference numerals, and thus detailed description thereof will be omitted and functions which are different from those described in Example 3 and 4 will be focused on in the following description. When an estimated flow rate obtained by the search measuring section 14 varies to such an extent as to exceed a measured flow rate obtained by the regular measuring section 13 by a prescribed value or more than the prescribed value, the determination section 16 shortens the regular measurement cycle set in the cycle setting section 9 and the integrating section 15 obtains a flow rate integrated value using a measured flow rate obtained by the regular measuring section 14.

In FIG. 7, times $t_1$ and $t_2$ represent the timing of a measurement by the regular measuring section 13. The regular measurement cycle lasts for T seconds, and measured flow rate values at times $t_1$ and $t_2$ are $Q_1$ and $Q_2$, respectively. Times $t_{11}$, $t_{12}$, $t_{13}$, $t_{21}$, and $t_{31}$ are the timing of a measurement by the search measuring section, and the cycle of the measurement is T/4 seconds and measured estimated flow rate values at times $t_{11}$, $t_{12}$, $t_{13}$, $t_{21}$, and $t_{31}$ are $Q_{11}$, $Q_{12}$, $Q_{13}$, $Q_{21}$, and $Q_{31}$, respectively. The determination section 16 stores the flow rate value $Q_1$ at time $t_1$, and then obtains from expression (5) a variation amount between the flow rate $Q_1$ and the estimated flow rates $Q_{11}$, $Q_{12}$, and $Q_{13}$ obtained at times $t_{11}$, $t_{12}$, and $t_{13}$, respectively. In this case, since any values of the obtained variation amount is small, a subsequent regular measurement is performed at time $t_2$ which is T seconds from $t_1$. At time $t_2$, the determination section 16 stores the measured flow rate $Q_2$ in a similar manner as performed at time $t_1$, and at time $t_{21}$, the determination section 16 obtains a variation amount of the estimated flow rate $Q_{21}$ with respect to $Q_2$. Since a value of the obtained variation amount exceeds the predetermined value m, the regular measurement is not performed at an original regular measurement time, i.e., at time $t_3'$ which is T seconds from time $t_2$, but it is performed at time $t_3$ before time $t_3'$. After a flow rate at time $t_3'$ is obtained, the cycle for a standard regular measurement set in the cycle setting section 9 is determined in accordance with the characteristic illustrated in FIG. 2. In FIG. 7, the regular measurement cycle is set anew to T/2 seconds and the subsequent regular measurement is performed at time $t_3'$. Although it has been described in Example 5, with reference to FIG. 7, that the standard regular measurement cycle is variable in accordance with the measured flow rate, even if the standard regular measurement cycle is fixed at a constant value (T seconds) regardless of the measured flow rate, the timing of the subsequent measurement is later than time $t_3'$. Even in such a case, the search measurement is performed every T/4 seconds, and thus, if flow rate variations are large at time $t_{31}$, it is still possible to shorten the cycle to less than T seconds.

As described above, in the case where flow rate variations obtained by the search measurement are large, by setting a short measurement cycle, the measurement sensitivity to flow rate variations can be increased.

In Example 5, although the determination of flow rate variations is obtained based on a rate of flow rate variations, the determination may be obtained based on an absolute magnitude. The determined value may be different among different flow rates.

Figure 8A:
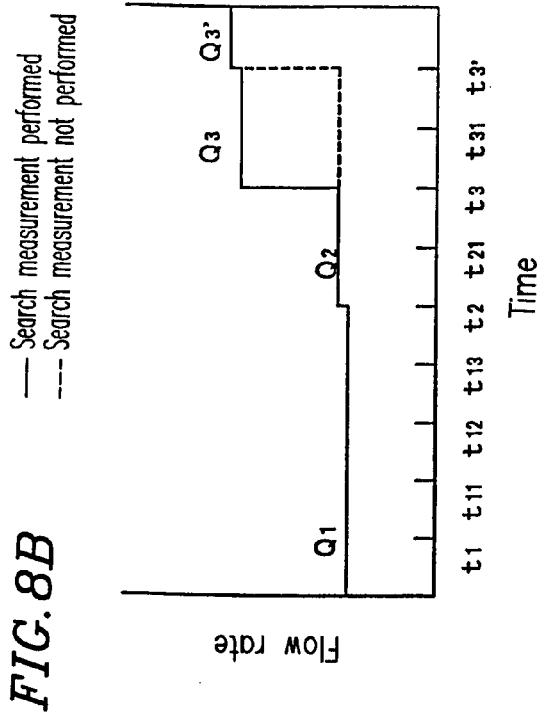
FIG. 8A is a graph illustrating a characteristic of temporal variations in a flow rate measured by the flow rate measuring apparatus according to Example 5 of the present invention.
Figure 8C:
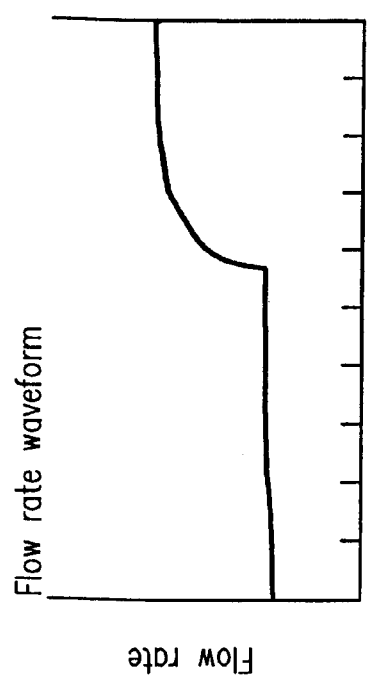
FIG. 8C is a graph illustrating a characteristic of a method for integrating flow rates from the present measurement to the end of a subsequent measurement using the integrating section in the flow rate measuring apparatus according to Example 5 of the present invention.
Figure 8B:
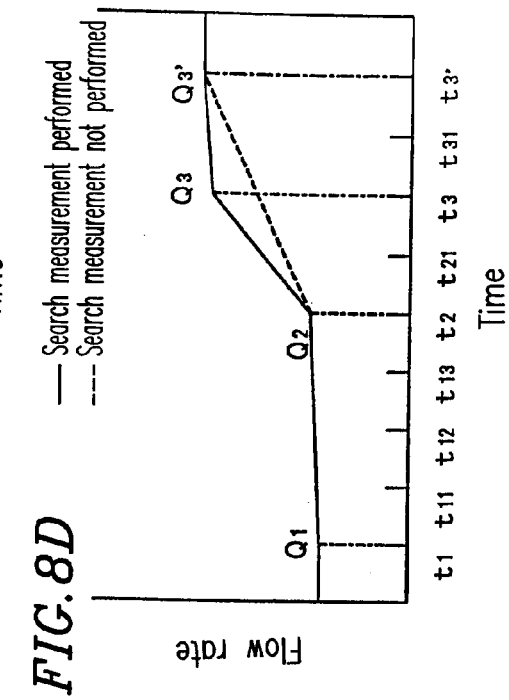
FIG. 8B is a graph illustrating a characteristic of a method for integrating flow rates from the end of the last measurement to the present measurement using an integrating section in the flow rate measuring apparatus according to Example 5 of the present invention.
Figure 8D:
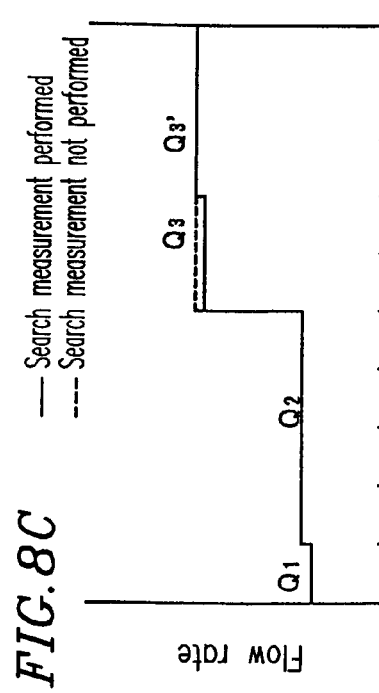
FIG. 8D is a graph illustrating a characteristic of a method for integrating flow rates by determining a linear approximation between measured values obtained at two successive measurement timings using the integrating section in the flow rate measuring apparatus according to Example 5 of the present invention.
Figure 9A:
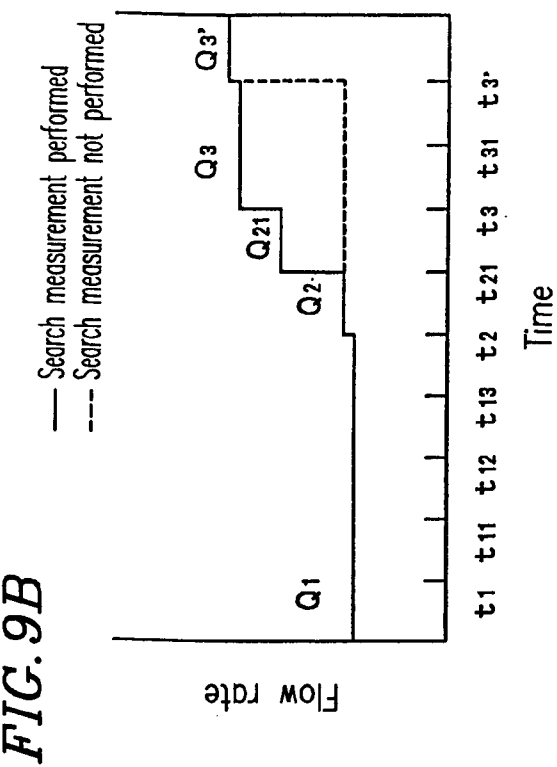
FIG. 9A is a graph illustrating a characteristic of temporal variations in a flow rate of a flow rate measuring apparatus according to Example 6 of the present invention.
Figure 9B:
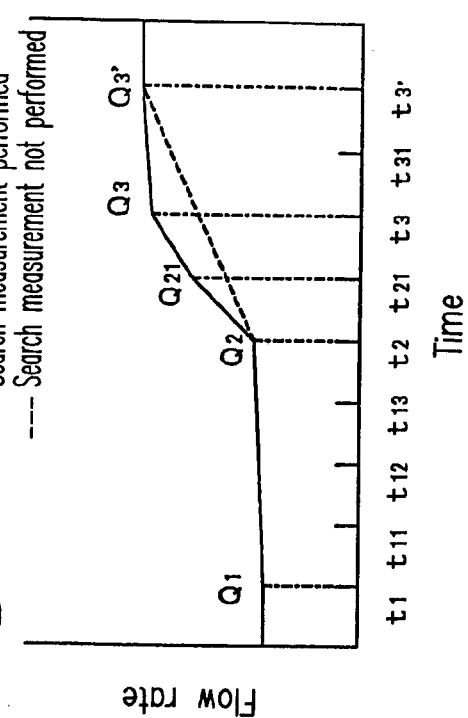
FIG. 9B is a graph illustrating a characteristic of a method for integrating flow rates from the end of the last measurement to the present measurement using an integrating section in the flow rate measuring apparatus according to Example 6 of the present invention.
Figure 9C:
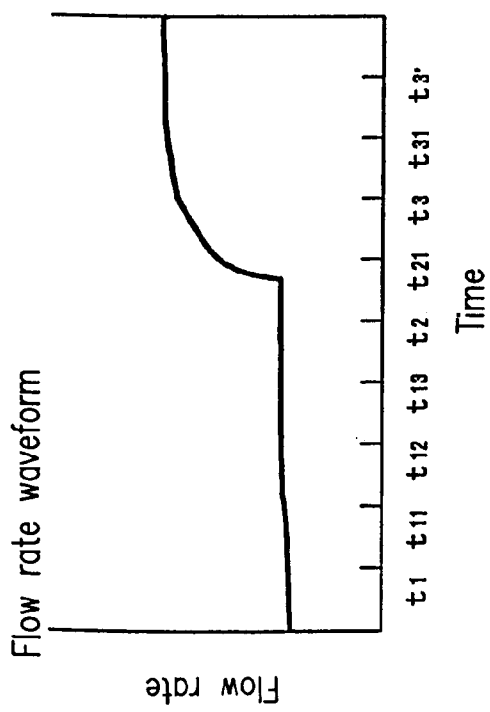
FIG. 9C is a graph illustrating a characteristic of a method for integrating flow rates from the present measurement to the end of the subsequent measurement using the integrating section in the flow rate measuring apparatus according to Example 6 of the present invention.
Figure 9D:
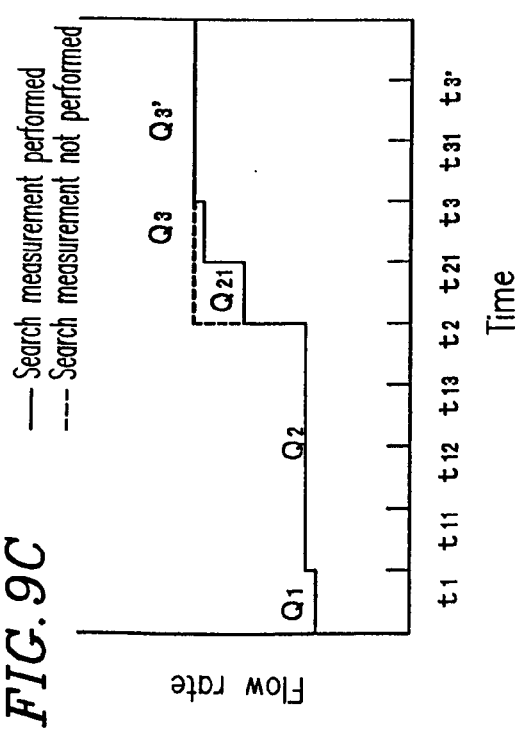
FIG. 9D is a graph illustrating a characteristic of a method for integrating flow rates by determining a linear approximation between measured values obtained at two successive measurement timings using the integrating section in the flow rate measuring apparatus according to Example 6 of the present invention.

Next, an integrating operation of the integrating section 16 is described. As representative examples of an integrating method for use in a flow rate meter which performs intermittent operations, there are provided the following three cases:

(a) the case where a flow rate immediately before a pause in a cycle is continuous (FIG. 8B; the case where a flow rate between times $t_1$ and $t_2$ in FIG. 8A is considered as $Q_1$);

(b) the case where a flow rate after a pause in a cycle is continuous (FIG. 8C; the case where a flow rate between times $t_1$ and $t_2$ in FIG. 8A is considered as $Q_2$); and (c) the case where a flow rate linearly varies before and after a pause in a cycle (FIG. 8D; the case where it is considered that there are flow rate variations represented by a straight line extending from $Q_1$ to $Q_2$ between times $t_1$ and $t_2$ in FIG. 8A).

Referring to FIGS. 8B–8D, the integrating method is described. In each of the above-described cases, when the search measurement is not performed, a flow rate obtained by a measurement which is performed at a cycle of T seconds is compared to a flow rate obtained by a search measurement which is performed at a cycle of T/4 seconds. In all of the cases, estimated flow rates obtained by the search measurement are not integrated. In each of FIGS. 8B–8D, an area enclosed by the solid lines represents an integrated flow rate when the search measurement is performed, and an area enclosed by the dashed lines represents an integrated flow rate when the search measurement is not performed. Comparing a flow rate waveform illustrated in FIG. 8A to flow rate waveforms illustrated in FIGS. 8B–8D, in all of the cases illustrated in FIGS. 8B–8D, the flow rate waveform representing the case where the search measurement is performed reflects a flow rate in the proximity of time $t_{21}$, where flow rate variations are detected, more exactly than the waveform representing the case where the search measurement is not performed. Therefore, the integrated flow rate can be more accurately obtained when the search measurement is performed in accordance with the present invention. In this example, all of the flow rate values used for integration are highly precise since they are obtained by the regular measuring section 13, and thus they are reliable.

As described above, in the case where flow rate variations obtained by the search measurement are large, by integrating values obtained by the regular measurement, highly-precise integrated flow rates can be obtained.

EXAMPLE 6

FIGS. 9A–9D are graphs each illustrating a characteristic of an operation of an integrating section according to Example 6 of the present invention.

Example 6 is different from Example 5 in that the integrating section 16 of Example 6 obtains a flow rate integrated value using a measured flow rate obtained by the regular measuring section 14 and an estimated flow rate obtained when predetermined flow rate variations are detected.

In Example 6, components denoted by the same reference numeral as in Example 5 have the same structure, and thus the description thereof will be omitted. In a similar manner as in Example 5, an integrated method will be described regarding the three cases (a)–(c) with reference to FIGS. 9A–9D. Example 6 is different from Example 5 in that an estimated flow rate $Q_{21}$ at time $t_{21}$ when flow rate variations are detected is reflected in flow rate integration. In each of FIGS. 9B–9D, an area enclosed by the solid lines represents an integrated flow rate when the search measurement is performed, and an area enclosed by the dashed lines represents an integrated flow rate when the search measurement is not performed. Comparing a flow rate waveform illustrated in FIG. 9A to flow rate waveforms illustrated in FIGS. 9B–9D, in all of the cases illustrated in FIGS. 9B–9D, the flow rate waveform representing the case where the search measurement is performed reflects a flow rate in the proximity of time $t_{21}$, where flow rate variations are detected, more exactly than the waveform representing the case where the search measurement is not performed. Therefore, the integrated flow rate can be more accurately obtained when the search measurement is performed. The flow rate variations in the proximity of time $t_{21}$ are more minutely represented and the measurement sensitivity to flow rate variations is increased.

As described above, in the case where flow rate variations obtained by the search measurement are large, by performing the regular measurement and integration, an estimated flow rate at a starting point of variations is reflected in an integrated value, and thus a high-precision integrated flow rate can be obtained by a measurement method with high sensitivity to flow rate variations.

Although Example 1–6 have described gas flow rate measuring apparatuses, it is understood that the same effects can be attained in a liquid flow rate measuring apparatus.

EXAMPLE 7

Figure 10:
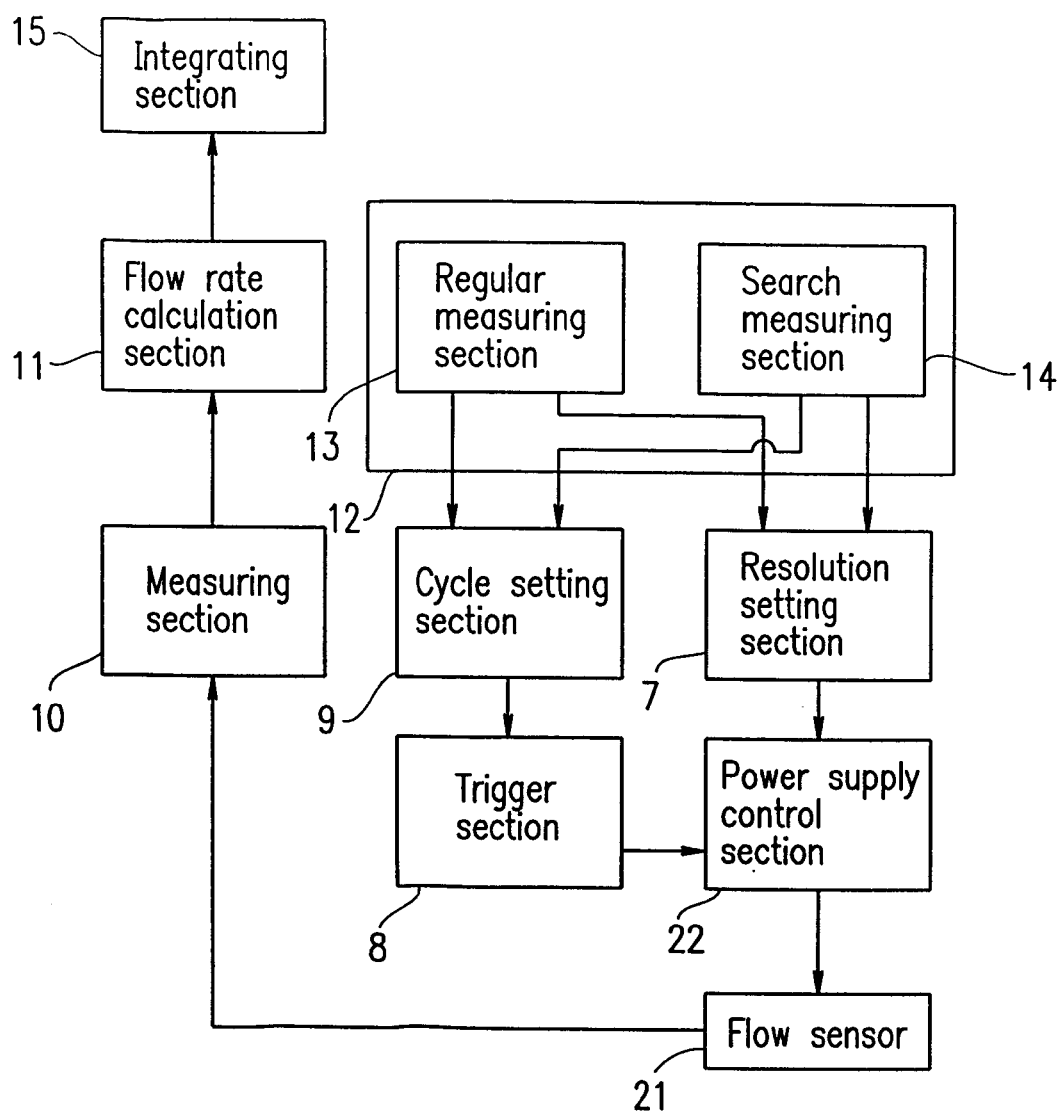
FIG. 10 is a block diagram of a flow rate measuring apparatus according to Example 7 of the present invention.
Figure 11:
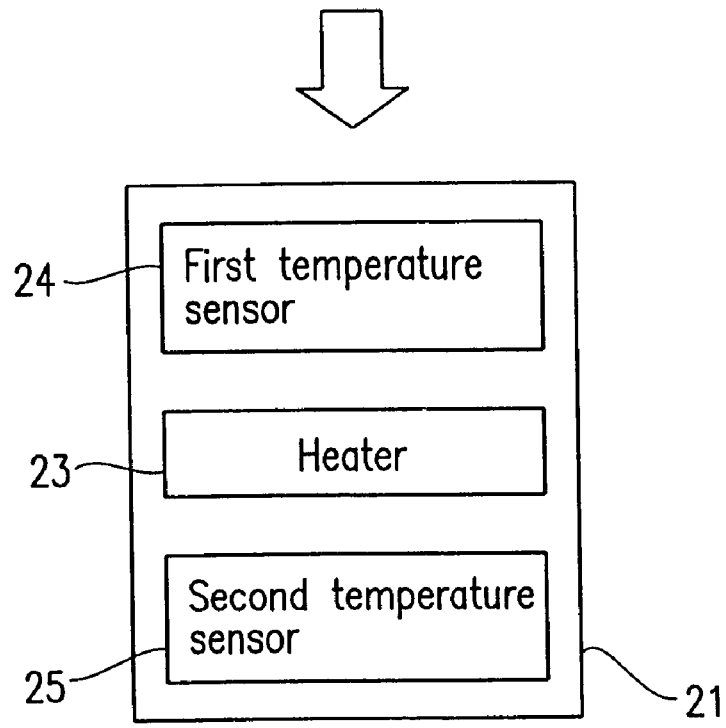
FIG. 11 is a block diagram of a flow sensor of the flow rate measuring apparatus according to Example 7 of the present invention.
Figure 12:
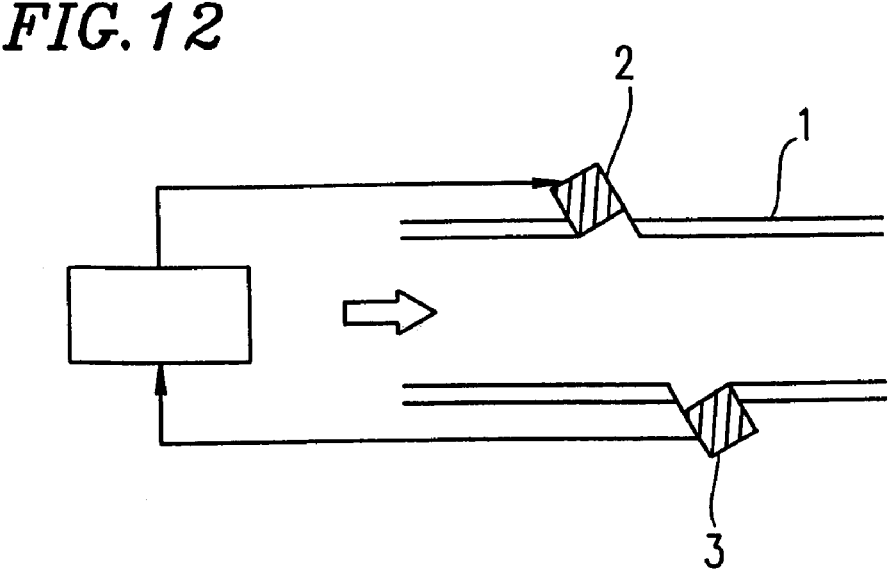
FIG. 12 is a block diagram of a conventional flow rate measuring apparatus.

FIG. 10 is a block diagram of a flow rate measuring apparatus according to Example 7 of the present invention. FIG. 11 is a block diagram of a flow sensor of the flow rate measuring apparatus of Example 7. In FIG. 10, reference numeral 21 denotes a flow sensor; reference numeral 22 denotes a power supply control section for controlling electric power supply to the flow sensor; reference numeral 7 denotes a resolution setting section for setting quantity of heat, i.e., a current, which is input to flow sensor 21; reference numeral 8 denotes a trigger section for giving instructions for a start of an intermittent measurement; reference numeral 9 denotes a cycle setting section for setting an output cycle of the trigger section 8; reference numeral 10 denotes a measuring section for measuring an output from the flow sensor 21; and reference numeral 11 denotes a flow rate calculation section for obtaining a flow rate from a measured value obtained by the measuring section 10. Reference numeral 12 denotes a measurement control section for controlling each of the elements denoted by reference numerals 2–11 and includes a regular measuring section 13 and a search measuring section 14. The regular measuring section 13 and the search measuring section 14 control measurement operations by setting numerical values in the resolution setting section 7 and the cycle setting section 9 in accordance with regular measuring and search measuring methods described below. Reference numeral 15 denotes an integrating section for obtaining an integrated flow rate by integrating flow rate values obtained by the flow rate calculation section 11.

A structure of the flow sensor 21 will now be described with reference to FIG. 11. The flow sensor 21 includes a first temperature sensor 24 and a second temperature sensor 25 which are provided on the upstream side and the downstream side, respectively, of a heater 23 provided in a fluid flow path. The measuring section 10 measures a difference in temperature between the first temperature sensor 24 and the second temperature sensor 25 which is caused by a fluid flow.

An operation and an effect of the flow rate measuring apparatus according to Example 7 will now be described. A thermal flow rate meter is generally driven in a intermittent manner since a heater consumes a great deal of electric power. For each lapse of a time set by the cycle setting section 9, the trigger section 8 outputs a measurement start trigger to the power supply control section 22, and simultaneously, the resolution setting section 7 sets a quantity of heat input to the heater 23. The power supply control section 22 controls an electrifying voltage or current so as to supply heat, a quantity of which is set by the resolution setting section 7, to the heater 23. When the quantity of heat supplied to the heater 23 is constant, a temperature difference T is in proportion to a mass flow rate in a range where the flow rate is small. When there is the same flow rate, by increasing the quantity of heat supplied to the heater 23, a temperature difference is increased, so that the flow rate measurement resolution is improved. The flow rate calculation section 11 obtains an instant flow rate value by multiplying the temperature difference T, which is measured by the measuring section 10, by a coefficient for the quantity of the input heat, and by further multiplying the resultant value by a proportional constant. The regular measuring section 13 causes the above-described sequential operation, which starts with the trigger output by the trigger section 8 and is ended by the calculation process by the flow rate calculation section 11, to be performed by inputting a quantity of heat $P_a$ set by and stored in the resolution setting section 7 to the heater 23 for each lapse of time $t_a$ (sec.) set by and stored in the cycle setting section 9. The flow rate obtained by this operation is called a measured flow rate. Before the cycle $t_a$ set by the cycle setting section 9 lapses, a rough flow rate is obtained by the search measuring section 14. The obtained flow rate is called an estimated flow rate. A procedure of obtaining the estimated flow rate is basically the same as that performed by the regular measuring section 13 except for the quantity of heat input to the heater 23. The search measurement is performed for the purpose of estimating a flow rate during an idling period of the regular measuring section, and thus it is necessary to perform the search measurement in a cycle which is shorter than that for the regular measurement and to reduce power consumption while precision can be slightly lowered. Along with an increase in the quantity of heat to be input, the power consumption is increased. Therefore, the search measurement may be performed such that the quantity of heat input to the heater 23 is less than the quantity of heat input to the heater 23 when the regular measurement is performed. The cycle setting section 9 sets cycle $t_b$ for the search measurement and stores this cycle. Starting with a trigger output at the time of the regular measurement, the trigger section 8 outputs a trigger at each lapse of the cycle $t_b$ ($<t_a$). The resolution setting section 7 sets the quantity of heat to be input $P_b$ ($<P_a$) for the search measurement and stores this quantity. After such a quantity of heat is input to the heater, the flow rate calculation section 11 obtains an estimated flow rate based on a measurement result obtained by the measuring section 10.

In a similar manner as in the above-described ultrasonic wave flow rate meter, electric power consumed by the search measurement is small and there is no need to use an additional flow rate detection section having another structure, so that the power consumption can be reduced and high-precision measurement can be realized.

The search measurement is performed such that the quantity of heat input to a heater is reduced in comparison to the case where the regular measurement is performed, and thus electric power consumed by the search measurement is less than that consumed by the regular measurement. Therefore, it is possible to increase the durability of the heater and the reliability of a thermal flow rate measuring apparatus including such a heater.

INDUSTRIAL APPLICABILITY

As is apparent from the above description, the flow rate measuring apparatus of the present invention provides the following effects.

The flow rate measuring apparatus of the present invention includes a search measuring section for obtaining an estimated flow rate in a shorter cycle using a coarser resolution in comparison to a regular measuring section. Flow rate variations can be detected by performing the search measurement, and thus the frequency of the use of the regular measurement can be reduced. The electric power consumed by the search measurement is small and there is no need to use an additional flow rate detection section having another structure, so that the power consumption can be reduced and high-precision measurement can be realized.

The flow rate measuring apparatus of the present invention may include a search measuring section for obtaining an estimated flow rate in a shorter cycle in comparison to the regular measuring section. Moreover, the number of times to repeat a search measurement is less than the number of times to repeat a regular measurement. In this case, the duration of the search measurement is shorter than that of the regular measurement and the search measurement is performed in an extremely instantaneous manner. Therefore, for example, fluctuations in a pulsed flow rate caused by fluctuations in a fluid pressure can be detected and it is possible to increase the measurement sensitivity to flow rate variations.

In case where a thermal flow sensor is used as a flow rate detection section, the search measurement is performed such that the quantity of consumed heat is reduced in comparison to the case where the regular measurement is performed, and thus it is possible to increase the durability of hot wires of the thermal flow sensor and the reliability of a thermal flow rate measuring apparatus including such a thermal flow sensor.

The regular measuring section may set a measurement cycle in the cycle setting section so as to last for a long period of time as a measured flow rate is decreased. In this case, by performing the search measurement, flow rate variations during the idling period of the regular measurement can be sensed, and in particular, when the flow rate is small, the measurement cycle can be set so as to last for a long period of time, so that the frequency of operation can be reduced, and thus the power consumption can be reduced.

The regular measuring section may set a measurement cycle in the cycle setting section so as to last for a long period of time as an estimated flow rate is decreased. In this case, by performing the search measurement, the flow rate variations can be predicted and the regular measurement cycle can be changed, and thus, in particular, when the flow rate is small, the power consumption can be reduced and it is possible to increase the measurement sensitivity to flow rate variations.

The regular measuring section may set a measurement resolution in the resolution setting section to be coarse as an estimated flow rate is increased. Flow rate variations can be predicted by performing the search measurement. In particular, when the flow rate is large, the measurement resolution is set to be coarse, so that and an operating current is reduced. Thus, the power consumption can be reduced.

When a difference between the measured flow rate and the estimated flow rate is less than a predetermined value, the regular measuring section may set the measurement cycle in the cycle setting section so as to last for a long period of time. In this case, by performing the search measurement, when the flow rate variations are small, the measurement cycle can be set so as to last for a long period of time, so that the frequency of operation can be reduced, and thus the power consumption can be reduced.

Moreover, when a difference between the measured flow rate and the estimated flow rate is less than a predetermined value, the regular measuring section may set the measurement resolution in the resolution setting section to be coarse. In this case, by performing the search measurement, when the flow rate variations are small, the measurement resolution can be set to be coarse, thus reducing an operating current. Thus, the power consumption can be reduced.

When a difference between the measured flow rate and the estimated flow rate is equal to or more than a predetermined value, the regular measuring section may set the measurement resolution in the resolution setting section to be fine. In this case, by performing the search measurement, when the flow rate variations are large, the measurement resolution can be set to be fine, and thus the measurement sensitivity to flow rate variations is increased.

Moreover, when a difference between the measured flow rate and the estimated flow rate is equal to or more than a predetermined value, the regular measuring section may set the measurement cycle in the cycle setting section to be short. In this case, by performing the search measurement, when the flow rate variations are large, the measurement cycle can be set to be short, and thus the measurement sensitivity to flow rate variations is increased.

The flow rate measuring apparatus of the present invention may further include an integrating section for performing an integrating process using only the measured flow rate. In the case where flow rate variations obtained by the search measurement are large, the regular measurement is performed and values obtained by the regular measurement are integrated. Thus, a high-precision integrated flow rate can be obtained.

The flow rate measuring apparatus of the present invention may further include an integrating section for performing an integrating process using the measured flow rate and an estimated flow rate, in which a difference between the measured flow rate and the estimated flow rate is equal to or more than a predetermined value. In the case where flow rate variations are large, the regular measurement and integration are performed, and an estimated flow rate at a starting point of variations is reflected in an integrated value, and thus a high-precision integrated flow rate can be obtained with high measurement sensitivity to flow rate variations.

What is claimed is:

1. A flow rate measuring apparatus, comprising:

a flow rate detection section provided in a fluid flow path;

a measuring section for measuring an output from the flow rate detection section;

a cycle setting section for setting a measurement cycle of the flow rate detection section;

a resolution setting section for setting a measurement resolution of the measuring section;

a flow rate calculation section for calculating a flow rate based on an output from the measuring section; and a measurement control section for controlling each of the sections, wherein
    the measurement control section includes:
        a regular measuring section for setting a predetermined value in the cycle setting section and the resolution setting section so as to obtain a measured flow rate based on a value obtained by the setting; and
        a search measuring section for setting in the cycle setting section a cycle which is shorter than that set by the regular measuring section and for setting a coarse resolution in the resolution setting section so as to estimate a flow rate based on a value obtained by the setting.

2. A flow rate measuring apparatus according to claim 1, wherein:
    the flow rate detection section includes a first transducer for transmitting an ultrasonic wave signal and a second transducer for receiving the ultrasonic wave signal;
    the measuring section repeats an ultrasonic wave propagation between the first transducer and the second transducer so as to measure an accumulated time of the ultrasonic wave propagation;
    the cycle setting section sets a measurement start cycle for the first transducer and the second transducer; and
    the resolution setting section sets the number of times to repeat the ultrasonic wave propagation.

3. A flow rate measuring apparatus according to claim 1, wherein:
    the flow rate detection section includes a thermal flow sensor;
    the measuring section measures heat output from the flow sensor;
    the cycle setting section sets a measurement cycle of the flow sensor; and
    the resolution setting section sets the quantity of heat input to the flow sensor so as to set a measurement resolution of the measuring section.

4. A flow rate measuring apparatus according to claim 1, wherein the regular measuring section sets the measurement cycle in the cycle setting section so as to last for a long period of time as the measured flow rate is decreased.

5. A flow rate measuring apparatus according to claim 1, wherein the regular measuring section sets the measurement cycle in the cycle setting section so as to last for a long period of time as the estimated flow rate is decreased.

6. A flow rate measuring apparatus according to claim 1, wherein the regular measuring section sets the measurement resolution in the resolution setting section to be coarse as the estimated flow rate is increased.

7. A flow rate measuring apparatus according to claim 1, wherein when a difference between the measured flow rate and the estimated flow rate is less than a predetermined value, the regular measuring section sets the measurement cycle in the cycle setting section so as to last for a long period of time.

8. A flow rate measuring apparatus according to claim 1, wherein when a difference between the measured flow rate and the estimated flow rate is less than a predetermined value, the regular measuring section sets the measurement resolution in the resolution setting section to be coarse.

9. A flow rate measuring apparatus according to claim 1, wherein when a difference between the measured flow rate and the estimated flow rate is equal to or more than a predetermined value, the regular measuring section sets the measurement resolution in the resolution setting section to be fine.

10. A flow rate measuring apparatus according to claim 1, wherein when a difference between the measured flow rate and the estimated flow rate is equal to or more than a predetermined value, the regular measuring section sets the measurement cycle in the cycle setting section to be short.

11. A flow rate measuring apparatus according to claim 10, further comprising an integrating section for performing integrating processing using only the measured flow rate.

12. A flow rate measuring apparatus according to claim 10, further comprising an integrating section for performing integrating processing using the measured flow rate and an estimated flow rate, wherein a difference between the measured flow rate and the estimated flow rate is equal to or more than a predetermined value.

13. A flow rate measuring apparatus, comprising:
    a flow rate detection section provided in a fluid flow path;
    a measuring section for measuring an output from the flow rate detection section;
    a cycle setting section for setting a measurement cycle of the flow rate detection section;
    a resolution setting section for setting a measurement resolution of the measuring section;
    a flow rate calculation section for calculating a flow rate based on an output from the measuring section; and
    a measurement control section for controlling each of the sections,
    wherein
        the measurement control section includes:
            a regular measuring section for setting a predetermined value in the resolution setting section so as to obtain a measured flow rate based on a value obtained by the setting; and
            a search measuring section for setting a resolution, which is coarser than that set in the regular measuring section, in the resolution setting section so as to estimate a flow rate based on a value obtained by the setting.

14. A flow rate measuring apparatus, comprising:
    a flow rate detection section provided in a fluid flow path;
    a measuring section for measuring an output from the flow rate detection section;
    a cycle setting section for setting a measurement cycle of the flow rate detection section;
    a resolution setting section for setting a measurement resolution of the measuring section;
    a flow rate calculation section for calculating a flow rate based on an output from the measuring section; and
    a measurement control section for controlling each of the sections,
    wherein
        the measurement control section includes:
            a search measuring section for setting a coarse resolution in the resolution setting section so as to estimate a flow rate based on a value obtained by the setting; and
            a regular measuring section for setting a resolution, which is finer than that set in the search measuring section, in the resolution setting section so as to measure a highly-precise flow rate based on a value obtained by the setting.

* * * * *